United States Patent Office 3,234,252
Patented Feb. 8, 1966

---

3,234,252
SILOXANE-POLYOXYALKYLENE COPOLYMERS
Anton S. Pater, Williamsville, N.Y., assignor to Union Carbide Corporation, a corporation of New York
No Drawing. Filed Oct. 2, 1962, Ser. No. 227,700
2 Claims. (Cl. 260—448.2)

This invention relates to aqueous lubricant compositions containing certain organosilicon compounds.

Conventional lubricants are generally composed of an organic lubricant base fluid (e.g. a petroleum oil) to which may have been added one or more additives (e.g. anti-oxidants and corrosion inhibitors). Such organic base fluids are relatively costly and possess poor heat transfer properties which are particularly undesirable when the fluid is employed in a lubricant in operations where a great deal of heat is generated by friction (e.g. in cutting operations). In such operations the inability of the organic base fluid to dissipate the heat may have deleterious effects (e.g. the fluid may volatilize and/or ignite).

Consequently, efforts have been made to develop lubricants wherein water comprises part or all of the base fluid since the inexpensiveness, good heat transfer properties and non-flammability of water obviates many of the disadvantages inherent in organic base fluids. The relatively poor load carrying and anti-wear properties of water have been to some extent overcome in such aqueous lubricants by incorporating additives therein. However, prior efforts to develop aqueous lubricants have not been entirely satisfactory owing to the properties of these additives. By way of illustration, some additives do not impart load carrying or anti-wear properties to the lubricant that are adequate for the demands of many applications, and other additives are unstable or corrosive. Moreover, some conventional additives impart poor wetting properties to the lubricant or promote foaming and some additives must be employed in excessively large amounts to be effective.

It is an object of this invention to provide additives for aqueous lubricants that impart improved load carrying and anti-wear properties to the lubricant, that are relatively stable and non-corrosive, that do not impair the wetting and anti-foaming properties to the lubricant and that can be employed effectively in relatively small amounts.

This invention is based on the discovery that copolymers composed of a siloxane moiety linked to a polyoxyalkylene moiety by a silicon to carbon bond can be employed as additives in aqueous lubricant compositions to achieve the aforementioned objects of this invention.

This invention provides improved lubricant compositions composed of:

A. A base fluid which can be water or a mixture of (a) water and (b) from 10 to 200 parts by weight (per 100 parts by weight of the water in the mixture) of an organic lubricant base fluid such as:

(1) A silicon-free polyoxyalkylene compound,
(2) A dialkyl ester of an aliphatic dicarboxylic acid
(3) A hydrocarbon lubricating oil; or
(4) Esters of polyhydric alcohols and fatty acids, and B. A siloxane-polyoxyalkylene copolymer composed of a siloxane moiety linked to a polyoxyalkylene moiety by a silicon to carbon bond, said copolymer being present in the composition in an amount from 0.05 to 10.0 parts by weight per 100 parts by weight of the base fluid.

The siloxane-polyoxyalkylene copolymers that are useful in the compositions of this invention are of the class that are known as "block" copolymers. Block copolymers are composed of at least two sections or blocks, at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention). Block copolymers can have linear, cyclic or branched (crosslinked) structures.

The siloxane blocks in the siloxane-polyoxyalkylene copolymers employed in the compositions of this invention contain at least two siloxane groups that are represented by the formula:

wherein R is a substituted or unsubstituted monovalent hydrocarbon group or a divalent hydrocarbon group and $b$ has a value from 1 to 3 inclusive. Preferably, R contains from one to about thirty carbon atoms. The groups represented by R can be the same or different in any given siloxane group or throughout the siloxane block, and the value of $b$ in the various siloxane groups in the siloxane block can be the same or different. The divalent hydrocarbon groups represented by R link the siloxane block to the oxyalkylene block. Each siloxane block contains at least one group represented by Formula 1 wherein at least one group represented by R is a divalent hydrocarbon group. The siloxane block has a ratio of hydrocarbon groups to silicon atoms from 1:1 to 3:1.

Illustrative of the unsubstituted monovalent hydrocarbon groups that are presented by R in Formula 1 are the alkenyl groups (for example, the vinyl and the allyl group); the cycloalkenyl groups (for example, the cyclohexenyl group); the alkyl groups (for example, the methyl, ethyl, isopropyl, octyl and dodecyl groups); the aryl groups (for example, the phenyl and naphthyl groups); the aralkyl groups (for example, the benzyl and the phenylethyl groups); the alkaryl groups (for example, the styryl, tolyl and n-hexylphenyl groups), and the cycloalkyl groups (for example, the cyclohexyl group).

Illustrative of the substituted monovalent hydrocarbon groups that are represented by R in Formula 1 are the alkenyl, cycloalkenyl, alkyl, aryl, aralkyl, alkaryl and cycloalkyl groups having halogen, cyano, amino, amido, salt, ester, (e.g. carbalkoxy or acyloxy), sulfur-containing (e.g. mercapto, SH) or nitro groups as substituents. Such R groups include the tetrafluoroethyl, trifluorovinyl, chloromethyl, gamma - chloropropyl, beta - cyanoethyl, gamma-cyanopropyl, cyanophenyl, gamma-amino propyl, delta - aminobutyl, N - beta - aminoethyl - gamma-aminopropyl, aminomethylphenyl, $H_2NCOCH_2CH_2$—, beta-carbethoxyethyl, beta-carboxyethyl, MeOOC(CH$_2$)$_{10}$-gamma-carbopropoxypropyl $CH_3COOCH_2CH_2$—, $CH_2$=$CHCOOCH_2CH_2$—, beta-mercaptoethyl, gamma-mercaptopropyl, $Cl_3C_6H_2SCH_2CH_2$— gamma-nitropropyl and nitrophenyl groups. The monovalent silicon-bonded salt groups include the groups having the formulae:

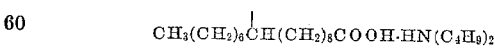

(derived from the dibutyl amine salt of oleic acid by reaction with a siloxane containing silanic hydrogen) and

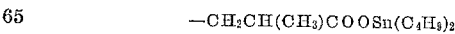

(derived from dibutyl tin methacrylate by reaction with a siloxane containing silanic hydrogen). Other monovalent silicon-bonded amide groups include those having the formulae:

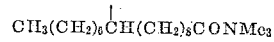

(derived from N,N dimethyl oleamide by reaction with a siloxane containing silanic hydrogen) and —CH$_2$CH$_2$CH$_2$NHCOC(Me)=CH$_2$ (derived from N-allyl methylacrylamide by reaction with a siloxane containing silanic hydrogen). Such substituent groups can be used to impart additional desirable properties to the copolymers [e.g. increased lubricity (imparted by halogens), self-emulsifying properties (imparted by amide groups), anti-corrosion (imparted by amino groups), increased surface activity (imparted by CN, COOH and ester groups), and higher dielectric properties (imparted by NO$_2$ groups)].

Illustrative of the divalent hydrocarbon groups represented by R in Formula 1 are the alkylene groups (such as the methylene, ethylene, propylene, butylene, 2,2-dimethyl-1,3-propylene and decyclene groups), the arylene groups (such as the phenylene and p,p'-diphenylene groups), the alkarylene groups (such as the phenylethylene group) and the alkylenearalkylene groups (such as the —CH$_2$C$_6$H$_4$CH$_2$CH$_2$— group and the

—CH$_2$C$_6$H$_4$CH$_2$— group). Preferably, the divalent hydrocarbon group is an alkylene group containing from two to four sucessive carbon atoms. Siloxane groups containing divalent hydrocarbon groups as substituents are illustrated by groups having the formulae:

—CH$_2$CH$_2$SiO$_{1.5}$

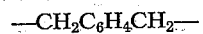
—CH$_2$CHCH$_2$SiO$_{1.5}$ and

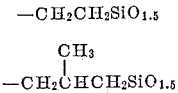

These divalent hydrocarbon groups are linked to a silicon atom of the siloxane block by a silicon-to-carbon bond and to an oxygen atom of the oxyalkylene block by a carbon-to-oxygen bond.

The siloxane block in the siloxane-polyoxyalkylene copolymers useful in the compositions of this invention can contain siloxane groups that are represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups).

The siloxane block in the siloxane-polyoxyalkylene copolymers useful in the compositions of this invention can contain one or more types of siloxane groups that are represented by Formula 1 provided that at least one group has at least one divalent hydrocarbon substituent. By way of illustration, only ethylenemethylsiloxy groups

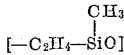

can be present in the siloxane block or the siloxane block can contain more than one type of siloxane group, e.g., the block can contain both ethylenemethylsiloxy groups and diphenylsiloxy groups, or the block can contain ethylenemethylsiloxy groups, diphenylsiloxy groups and diethylsiloxy groups.

The siloxane block contained in the siloxanepolyoxyalkylene copolymers useful in the compositions of this invention can contain tri-functional siloxane groups (e.g., monomethylsiloxane groups, CH$_3$SiO$_{1.5}$), difunctional siloxane groups (e.g., dimethylsiloxane groups, (CH$_3$)$_2$SiO—), monofunctional siloxane groups (e.g., trimethylsiloxane groups, (CH$_3$SiO$_{0.5}$), or combinations of these types of siloxane groups having the same or different substituents. Due to the functionality of the different siloxane groups, the siloxane block can be predominantly linear or cyclic or crosslinked or it can have combinations of these structures. When different types of siloxane groups are present they can be alternating, in blocks, randomly distributed or in any other sequence.

The siloxane block contained in the siloxanepolyoxyalkylene copolymers useful in the compositions of this invention can contain organic end-blocking or chain terminating organic groups, in addition to the monofunctional siloxane chain terminating groups encompassed by Formula 1. By way of illustration, the siloxane block can contain such organic end-blocking groups as the hydroxyl group, the aryloxy groups (such as the phenoxy group), the alkoxy groups (such as the methoxy, ethoxy, propoxy and butoxy groups), the acyloxy groups (such as the acetoxy group), and the like.

The siloxane blocks in the siloxane-polyoxyalkylene copolymers useful in the compositions of this invention contain at least two siloxane groups that are represented by Formula 1. Preferably, the siloxane blocks contain a total of from five to twenty siloxane groups that are represented by Formula 1. That part of the average molecular weight of the copolymer that is attributable to the siloxane blocks can be as high as 50,000 but preferably it is from 220 to 20,000. If that part of the average molecular weight of the copolymer that is attributable to the siloxane blocks exceeds 50,000 or if the siloxane blocks contain a total of more than twenty siloxane groups that are represented by Formula 1, the copolymers are usually difficult to produce.

A siloxane block can contain, in addition to the groups represented by Formula 1, siloxane groups represented by the formula:

wherein R has the meaning defined in Formula 1, $e$ has a value from 0 to 2, $f$ has a value from 1 to 2 and ($e+f$) has a value from 1 to 3, inclusive.

The siloxane block can also contain, in addition to the groups represented by Formula 1, tetrafunctional groups represented by the formula:

wherein R is an unsubstituted monovalent hydrocarbon group as defined for Formula 1 and $n$ has a value from 0 to 3 inclusive. Illustrative of such groups are the SiO$_2$, ethoxysiloxy, diethoxysiloxy, triethoxysiloxy and phenoxysiloxy groups.

The oxyalkylene blocks in the siloxane-polyoxyalkylene copolymers employed in the compositions of this invention each contain at least two oxyalkylene groups that are represented by the formula:

[—R'O—]     (2)

wherein R' is an alkylene group. Preferably, the alkylene group represented by R; in Formula 2 contains from two to about ten carbon atoms, and most preferably from two to three carbon atoms. Illustrative of the oxyalkylene groups that are represented by Formula (2) are the oxyethylene, oxy-1,2-propylene, oxy-1,3-propylene, oxy-2,2-dimethyl-1,3-propylene, oxy-1,10-decylene groups and the like.

The oxyalkylene blocks in the siloxane-polyoxyalkylene copolymers useful in the compositions of this invention can contain one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene blocks in the siloxane-polyoxyalkylene copolymers employed in the compositions of this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also, a single group can serve as an end-blocking group for more than one oxyalkylene block. For example, the glyceroxy group,

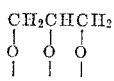

can serve as an end-blocking group for theree oxyalkylene chains.

The oxyalkylene blocks in the siloxane-polyoxyalkylene copolymers useful in the compositions of this invention each contain at least two oxyalkylene groups that are represented by Formula 2. Preferably, each block contains from two to thirty of such groups. That part of the average molecular weight of the copolymer that is attributable to the oxyalkylene blocks can vary from 88 [for $(C_2H_4O)_2$] to 20,000, but preferably it is from 132 to 25,000. Provided that each oxyalkylene block contains at least two oxyalkylene groups represented by Formula 2, the number of oxyalkylene groups and that part of the average molecular weight of the copolymer that is attributable to the oxyalkylene blocks is not critical, but those copolymers in which that part of the average molecular weight that is attributable to the oxyalkylene blocks exceeds 200,000 or that contain more than fifty oxyalkylene groups per block are less useful, e.g., they are too viscous for convenient use in the formulations of this invention.

The siloxane-polyoxyalkylene copolymers useful in the compositions of this invention can contain siloxane blocks and oxyalkylene blocks in any relative amount. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 40 parts by weight of the siloxane blocks and from 60 parts by weight to 95 parts by weight of the oxyalkylene blocks per 100 parts by weight of the copolymer.

The siloxane-polyoxyalkylene copolymers useful in the compositions of this invention can contain more than one of each of the blocks and the blocks can be arranged in various configurations such as linear, cyclic or branched configurations. By way of illustration, the following classes of compounds are among the siloxane-oxyalkylene block copolymers useful in the formulations of this invention:

(A) Copolymers that contain at least one unit that is represented by the formula:

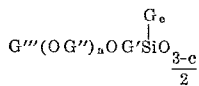   (3)

(B) Copolymers that contain at least one unit that is represented by the formula:

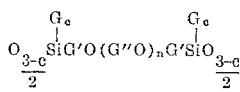   (4)

(C) Copolymers that contain at least one unit that is represented by the formula:

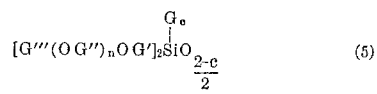   (5)

In the above Formulas 3, 4 and 5, G is a monovalent hydrocarbon radical, G' is a divalent hydrocarbon radical, G" is an alkylene radical containing at least two carbon atoms, G''' is a hydrogen atom or a monovalent hydrocarbon radical free of aliphatic unsaturation and $n$ has a value of at least two and $c$ has a value from 0 to 2 in Formulas 3 and 4 and a value from 0 to 1 in Formula 5. In Formulas 3, 4 and 5, G can represent the same or different radicals, $n$ preferably has a value from 3 to 30 inclusive and G" can represent the same or different radicals, i.e., the group $(OG")_n$ can represent, for example, the groups: $-(OC_2H_4)_p-$,

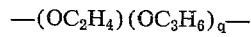

$-(OC_3H_6)_p(OC_8H_{16})_q-$, where $p$ and $q$ are integers having a value of at least one in any given molecule but may have average fractional values where the formulae represent mixtures of copolymers. Copolymers of the latter classes can consist only of units represented by Formulae 3, 4 or 5 or they can consist of from 1 to 99 mole-percent of such units and from 1 to 99 mole-percent of units represented by Formula 1 wherein R is an unsubstituted monovalent hydrocarbon group and $b$ has a value from 1 to 3 inclusive.

The monovalent hydrocarbon radicals represented by G in Formulas 3, 4 and 5 can be saturated or olefinically unsaturated or can contain benzenoid unsaturation. Illustrative of the monovalent hydrocarbon radicals represented by G are the linear aliphatic radicals (e.g., the methyl, ethyl and decyl radicals), the cycloaliphatic radicals (e.g., the cyclohexyl and the cyclopentyl radicals), the aryl radicals (e.g. the phenyl, tolyl, xylyl and naphthyl radicals), the aralkyl radicals (e.g., the benzyl and beta-phenylethyl radicals), and the unsaturated linear aliphatic radicals (e.g., the cyclohexenyl radical).

Preferably, the G and G' groups [included in the definition of R in Formulas 1 and 1–a above] contain from one to about twelve carbon atoms and the G" groups [included in the definition of R' in Formula 2 above] contain from two to about ten carbon atoms. When the G''' group is a monovalent hydrocarbon radical free of aliphatic unsaturation it preferably contains from one to about eighteen carbon atoms.

Illustrative of the divalent hydrocarbon radicals represented by G' in Formulas 3, 4 and 5 are the alkylene radicals (e.g., the methylene, ethylene, 1,3-propylene, 1,4-butylene and 1,12-dodecylene radicals), the arylene radicals (e.g., the phenylene radical) and the alkarylene radicals (e.g., the phenylethylene radicals). In Formulas 3, 4 and 5, G' is preferably an alkylene radical containing at least two carbon atoms.

Illustrative of the alkylene radicals containing at least two carbon atoms represented by G" in Formulas 3, 4 and 5 are ethylene, 1,2-propylene, 1,3-propylene, 1,6-hexylene, 2-ethylhexylene-1,6 and 1,12-dodecylene radicals.

Illustrative of the radicals represented by G''' in Formulas 3, 4 and 5 are the saturated linear or branched chain aliphatic hydrocarbon radicals (e.g., the methyl, ethyl, propyl, n-butyl, tert-butyl and decyl radicals), the radicals), and the aralkyl hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and beta-phenylethyl radicals).

The copolymers employed in the compositions of this invention, particularly those containing at least one unit represented by Formulae 3, 4 or 5, can also contain at least one of the units represented by the formulae:

 (6)

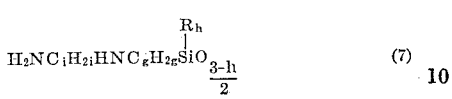 (7)

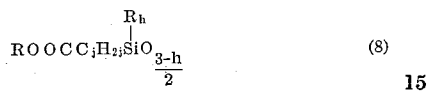 (8)

 (9)

 (10)

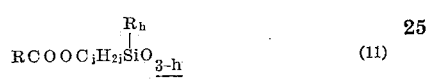 (11)

or

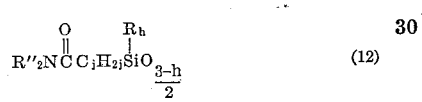 (12)

wherein R is an unsubstituted monovalent hydrocarbon group as defined above, R" is an unsubstituted monovalent hydrocarbon group as defined for R above, or hydrogen, g has a value from 3 to 5 (or even up to 20) inclusive, h has a value from 0 to 2 inclusive, i has a value from 2 to 3 inclusive, and j has a value from 2 to 4 inclusive. Such copolymers can contain from 1 to 99 mole-percent of units represented by Formulae 3, 4 or 5 and from 1 to 99 mole-percent of units represented by Formulae 6, 7, 8, 9, 10, 11, or 12. Alternatively such copolymers can contain from 1 to 98 mole-percent of units represented by Formulae 3, 4 or 5; from 1 to 98 mole-percent of units represented by Formulae 6, 7, 8, 9, 10, 11, or 12; and from 1 to 98 mole-percent of units represented by Formula 1 wherein R is an unsubstituted monovalent hydrocarbon group and b has a value from 1 to 3 inclusive.

The organic and inorganic acid salt groups produced from the groups represented by Formulae 6 and 7 and the —COOH groups produced by hydrolyzing the groups represented by Formula 11 can also be present in the copolymers employed in the compositions of this invention.

The following are representative of the siloxane-polyoxyalkylene block copolymers useful in the compositions of this invention. In the formulas, Me represents methyl (CH$_3$—), Bu represents butyl (C$_4$H$_9$—), Et represents ethyl (CH$_3$CH$_2$—), φ represents phenyl (C$_6$H$_5$—), and x is an integer. Where the formula represents a unit of a polymer, it is understood that the polymer is terminated by end-blocking groups of the type described hereinabove.

COPOLYMER I

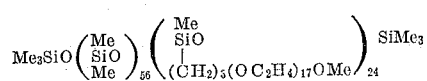

COPOLYMER II

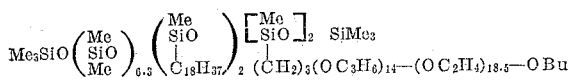

COPOLYMER III

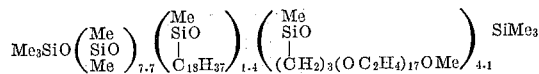

COPOLYMER IV

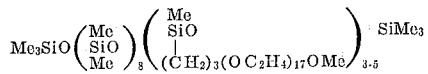

COPOLYMER V

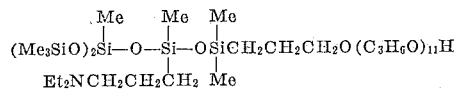

COPOLYMER VI

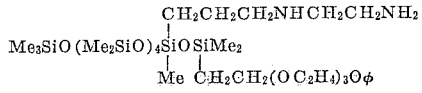

COPOLYMER VII

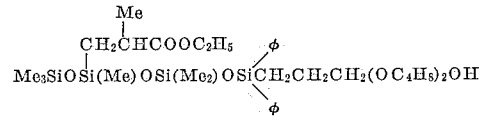

COPOLYMER VIII

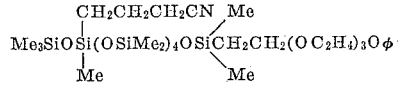

COPOLYMER IX

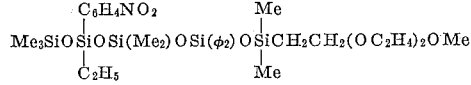

COPOLYMER X

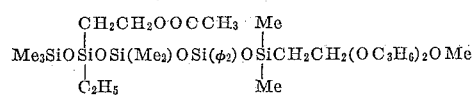

COPOLYMER XI

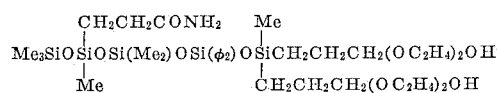

COPOLYMER XII

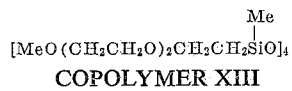

COPOLYMER XIII

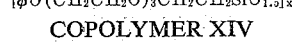

COPOLYMER XIV

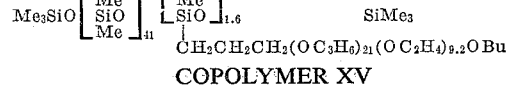

COPOLYMER XV

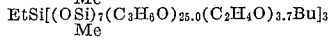

COPOLYMER XVI

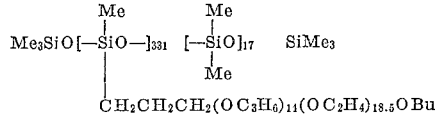

In the examples presented below, the specific copolymers appearing above are identified for brevity as "Copolymer I," "Copolymer II," etc.

The polysiloxane-oxyalkylene block copolymers that are useful in the compositions of this invention can in general be prepared by two convenient methods. The first method, known as the metathesis process, involves forming a mixture of a siloxane polymer containing a silicon-bonded, halogen-substituted monovalent hydrocarbon group and an alkali metal salt of an oxyalkylene polymer and heating the mixture to a temperature sufficiently elevated (e.g. preferably from 80° C. to 150° C.) to cause the siloxane polymer and the salt to react to produce the copolymer. This process can be illustrated by the following equation:

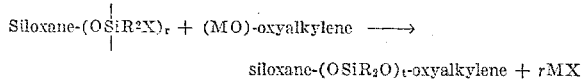
$$\text{siloxane-}(OSiR_2O)_r\text{-oxyalkylene} + rMX$$

wherein $R^2$ is a divalent hydrocarbon group, $r$ is an integer that has a value of at least 1 and preferably 1 to about 4, X is a halogen atom, M is an alkali metal, siloxane denotes a siloxane block and oxyalkylene denotes an oxyalkylene block.

The second method, known as the addition process, involves forming a mixture of an organo-siloxane polymer containing a hydrogen-siloxy group

an oxyalkylene polymer containing an alkenyloxy end-blocking or chain terminating group and a platinum catalyst (e.g. from 0.001 to 5.0 weight-percent based on the reactants of elemental platinum or chloroplatinic acid) and heating the mixture to a temperature sufficiently elevated (e.g. preferably from 90° C. to 170° C.) to cause the siloxane polymer and the oxyalkylene polymer to react to produce the copolymer. This process can be illustrated by the following equation:

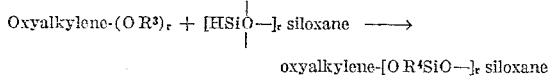
$$\text{oxyalkylene-}[OR^4SiO\text{—}]_r\text{ siloxane}$$

wherein oxyalkylene, siloxane and $r$ have the meaning defined for Formula 7, $OR^3$ is an alkenyloxy group (such as the vinyloxy and the allyloxy groups) and $R^4$ is an alkylene group containing at least two successive carbon atoms.

When the polysiloxane-oxyalkylene block copolymer contains silicon-bonded hydrogen atoms, i.e., contains two units represented by Formula 1–a hereinabove, the addition process is preferable. If the metathesis process is used, many of the silicon-bonded hydrogen atoms will undergo side reactions that are catalyzed by the alkali metal ions present in the reaction mixture.

When the copolymer useful in this invention contains olefinically unsaturated groups attached to silicon (for example, when R in Formulas 1 or 1–a above, is alkenyl or cycloalkenyl such as vinyl or cyclohexenyl) it is preferable to prepare these copolymers by addition of the alkenyloxy-end-blocked oxyalkylene polymer to a monomeric, hydroylzable silane containing silicon-bonded hydrogen, followed by co-hydrolysis or co-condensation with other hydrolyzable silanes containing silicon-bonded hydrogen and silicon-bonded olefinically unsaturated hydrocarbon groups using conventional techniques known to those versed in the art. For example, reaction of $CH_2=CHCH_2(OC_2H_4)_6OCH_3$ with $CH_3SiHCl_2$ in the presence of a platinum catalyst followed by cohydrolysis of the product with $CH_2=CHSi(CH_3)Cl_2$, $CH_3SiHCl_2$, and $(CH_3)_3SiCl$ gives a copolymer of this invention containing units have the formulas $$[CH_3O(C_2H_4O)_6CH_2CH_2CH_2Si(CH_3)O]$$

$[CH_2=CHSi(CH_3)O]$, and $[CH_3SiHO]$, end-block with $[(CH_3)_3SiO]$ groups.

Siloxane-polyoxyalkylene copolymers containing groups represented by Formulas 6 to 9, 11 and 12 are also readily prepared by addition reactions between copolymers containing groups represented by Formula 1–a and suitable olefinically unsaturated organic compounds (e.g. N-allyl ethylene diamine, allyl cyanide, ethyl acrylate, allyl diethyl amine, ethyl methacrylate, vinyl acetate, trichloro- styrene and the amide of acrylic acid). In such addition reactions, known catalysts for addition reactions (e.g. platinum, chloroplatinic acid, amines, phosphines, etc.) can be advantageously employed and the process conditions conventionally employed in known addition reactions are applicable.

Siloxane-polyoxyalkylene copolymers containing groups represented by Formulas 6 to 12 are also readily produced by the cohydrolysis and co-condensation of hydrogen alkoxysilanes [e.g. $HSi(OC_2H_5)_3$] and alkoxysilanes containing the appropriate organofunctional groups [e.g. $O_2NC_6H_4Si(OC_2H_5)_3$] to produce a siloxane [e.g.

$$(HSiO_{1.5}) \text{ x } (O_2NC_6H_4SiO_{1.5})_y]$$

which can then be converted to a siloxane-polyoxyalkylene copolymer [e.g.

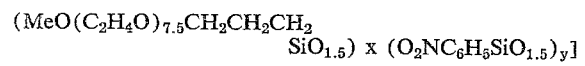

by reaction with a suitable alkenyloxy end-blocked polyoxyalkylene compound [e.g.

$$CH_2=CHCH_2O(C_2H_4O)_{7.5}Me]$$

in accordance with the above-described addition process. Conventional cohydrolysis and co-condensation procedures can be used in this method.

The organic lubricant base fluids that are suitable for use in the various compositions of this invention include the various conventional organic lubricant base fluids. Typical of suitable lubricants are silicon-free polyoxyalkylene compounds, dialkyl esters of aliphatic dicarboxylic acids, hydrocarbon lubricating oils and esters of polyhydric alcohols and fatty acids.

Among the silicon-free polyoxyalkylene compounds that are suitable for use as organic lubricant base fluids in the compositions of this invention are those represented by the formula:

$$G'''(OG'')_nOG''' \qquad (13)$$

wherein $G'''$, $G''$ and $n$ have the above-defined meanings. Illustrative of the compounds represented by Formula 1 are $C_4H_9(OC_3H_6)_{10}OC_4H_9$, $CH_3(OC_3H_6)_{12}OC_4H_9$ and $C_8H_{17}(OC_3H_6)_{14}OC_8H_{17}$. A preferred class of compounds represented by Formula 13 are those having a viscosity between 5000 and 12,000 centistokes at −65° F. and a viscosity between 2.5 and 3.5 centistokes at 310° F.

Among the dialkyl esters of aliphatic dicarboxylic acids that are suitable for use as organic lubricant base fluids in the compositions of this invention are those represented by the formula:

$$R''OOC(C_pH_{2p})COOR'' \qquad (14)$$

wherein $R''$ is an alkyl group containing from 6 to 10 carbon atoms inclusive and $p$ has a value from 6 to 10 inclusive. Illustrative of the compounds represented by Formula 14 are $C_6H_{13}OOC(CH_2)_6COOC_6H_{13}$, di-2-ethylhexyl)sebacate and $C_{10}H_{21}OOC(CH_2)_{10}COOC_{10}H_{21}$.

Among the hydrocarbon lubricating oils that are suitable for use as organic lubricant base fluids in the compositions of this invention are the paraffinic lubricating oils, naphthenic lubricating oils and mixtures of such oils. Illustrative of such hydrocarbon lubricating oils are commercially available materials such as "Gulf Security Oil A," and "Kendall Automatic Transmission Oil," Mid-Continental Oils, Coastal Oils, solvent extracted oils and acid treated oils. Typical of such oils are those having viscosities which range from 30 Saybolt Universal seconds at 100° F. to 100 Saybolt Universal seconds at 210° F.

Among the esters of polyhydric alcohols and fatty acids that are suitable for use as organic lubricant base fluids in the compositions of this invention are the esters of alcohols such as glycerol, pentaerythritol and trimethylolethane and acids such as oleic acid, stearic acid, coconut fatty acids and valeric acid. Such esters include those produced by reacting a polyhydric alcohol with a mixture of fatty acids.

The relative amount of the siloxane-polyoxyalkylene copolymer and the base fluid employed in the compositions of this invention for best results is not narrowly critical and can vary over a wide range depending upon such factors as the type of metals to be lubricated by the composition, the type of base fluid, the type of copolymer, the temperature and load conditions under which the composition is to be used as a lubricant and similar factors. In general, from 0.05 to 10 parts by weight of the copolymer per 100 parts by weight of the base fluid (i.e. the water and any organic lubricant base fluid) are desirable but from 1 to 5 parts by weight of the copolymer per 100 parts by weight of the base fluid are preferred. Similarly, the relative amount of water and any organic lubricant base fluid present in the base fluid for best results is not narrowly critical and it can vary widely depending upon such factors as the compatibility of the water and the organic lubricant base fluid, economic conditions, the compatibility of the copolymer with the base fluid and the like. In general from 10 to 200 parts by weight of the organic lubricant base fluid per 100 parts by weight of water are desirable but from 50 to 130 parts by weight of the organic lubricant base fluid per 100 parts by weight of water are preferred. The relative amounts of the copolymer, water and organic lubricant base fluid other than those mentioned above can be employed but no commensurate advantage is gained thereby.

The siloxane-polyoxyalkylene copolymers employed in the compositions of this invention can be dissolved in the base fluid to form a solution or dispersed in the base fluid to form an emulsion or a suspension. Similarly, the water and the organic base fluid can be in the form of a solution or an emulsion (i.e. either a water in organic base fluid emulsion or an organic base fluid in water emulsion).

The compositions of this invention can contain freezing point depressants (preferably methanol or ethylene glycol) in an amount from 1 to 200 parts by weight (per 100 parts by weight of the water in the composition). Preferably the freezing point depressant is present in an amount from 1 to 100 parts by weight (per 100 parts by parts by weight of the water in the composition).

The compositions of this invention can contain, in addition to the siloxane-polyoxyalkylene copolymer and the base fluid, various other additional additives which may be present to impart particular properties to the lubricant compositions. Among such additives are corrosion inhibitors, anti-oxidants, blooming agents, oiliness agents, anti-wear agents, solubilizers, metal deactivators, extreme pressure additives, viscosity index improvers, pour point depressants, viscosity modifiers (e.g. glycerol), anti-foam agents, metal deactivators, wetting agents, adhesive agents, cohesive agents, emulsifying agents, deemulsifying agents, break-in agents, sludge dispersants, anti-sludge agents, anti-coking agents, detergents, extreme pressure additives and swelling agents (where the composition comes into contact with rubber). Compounds such as $(MeO)_3SiCH_2CH_2CH_2(OC_2H_4)_{7.5}OMe$ can be added as thickeners. The compositions of this invention can, if desired, contain the above-mentioned additional additives in amounts from 0.1 to 5 parts by weight (per 100 parts by weight of the base fluid) of each such additive. From 0.5 to 2 parts by weight (per 100 parts by weight of the base fluid) of each such additive are preferred. These additives can be omitted entirely in many applications.

Suitable additional extreme pressure additives include graphite, talc, molybdenum sulfide, alkylamine salts of acid alkyl esters of phosphoric acid in which the amine salt constitutes at least 25 percent by weight, the alkyl groups here referred to containing from 8 to 18 carbon atoms each. Suitable additives coming within this group are dodecylamine dodecyl acid phosphate, blends made up of from 25 to 95 percent of dodecylamine dodecyl acid phosphate and from 75 to 95 percent of dodecyl dihydrogen phosphate, octylamine dioctyl phosphate, di(decylamine) dodecyl phosphate, hexadecylamine dodecyl acid phosphate, octadecylamine dioctadecyl phosphate, and blends containing 2-ethyl-hexylamine, 2-ethylhexyl acid phosphate and 2-ethylhexyldihydrogen phosphate in equal proportions. Suitable anti-wear additives include the amine salts of long chain aliphatic acids, neutral aryl phosphates and neutral alkyl aryl phosphates. Representative additives coming within this grouping are the dipropylamine, dibutylamine, and diamylamine salts of lauric acid, triphenyl phosphate, tricresyl phosphate, butyl diphenyl phosphate, phenyl dibutyl phosphate, benzyl dicresyl phosphate, trixylyl phosphate and diphenyl cresyl phosphate. Suitable metal deactivator additives include quinizarin and alizarin.

The antioxidants that are useful in the compositions of this invention include (1) aromatic compounds that contain at least one substituent group that causes the compound to be susceptible to oxidation, (such as an amino, a hydroxyl or an alkoxy group) and (2) dialkyl selenides.

Illustrative of these aromatic antioxidants are such substituted aromatic compounds as primary, secondary and tertiary aryl amines (for example, diphenyl amine, N-phenyl-alpha-naphthyl-amine, N-phenyl-beta-naphthylamine and N,N'-bis-dinaphthyl-para-phenylene diamine); hydroxy-substituted aromatic compounds including alkyl-substituted monohydric phenols (for example 2,6-di(tert-butyl)4-methyl phenol and 6-tert-butyl-meta-cresol), aryloxy-substituted phenols (for example 2(tert-butyl)4-phenoxy phenol), trihydric phenols (for example pyrogallol), dihydric phenols (for example 4-tert-butyl catechol, 4-phenyl catechol, 2,5-di(tert-butyl)hydroquinone, 3-methyl catechol and cyclohexyl catechol), di(hydroxyphenol)alkanes (for example bis-(2-hydroxy-3-tert-butyl-5-methyl phenol) methane), dihydric naphthols (for example, 1,5-dihydroxynaphthylene, hydroxyl-substituted aryl amines (for example ortho-aminophenol, and N-butyl-para-aminophenol) and aralkoxy-substituted phenols (for example hydroquinone monobenzyl ether); and dialkoxy-substituted aromatic compounds (for example hydroquinone dimethyl ether). The preferred aromatic antioxidants are alkyl-substituted monohydric phenols such as 2,6-di(tert-butyl) 4-methyl phenol and secondary aryl amines, such as N-phenyl-alpha-naphthylamine, N-phenyl-beta-naphthylamine and N,N'-bis-dinaphthyl-para) phenylene diamine. In general, it was found that aromatic antioxidants containing amino groups, especially secondary amine groups, were more effective in stabilizing the compositions of this invention than aromatic antioxidants containing only hydroxyl groups as substituents.

The dialkyl selenides that are useful in the compositions of this invention as anti-oxidants include dihexyl selenide, didodecyl selenide, hexyl dodecyl selenide, di(2-ethylhexyl) selenide, dioctadecyl selenide, isooctyl hexadecyl selenide, and the like. In these compounds each alkyl group attached to the selenium atom preferably contains from 6 to 18 carbons atoms.

The corrosion inhibitors that are useful in the compositions of this invention include morpholine, the alkali metal nitrites (e.g. potassium nitrite and sodium nitrite), the alkali metal mercaptobenzothiazoles (e.g. the sodium salt of mercaptobenzothiazol), disalicylapropylenediamine, aminoorganosilicon compounds, alkali metal salts of carboxyorganosiloxanes, alkenyl succinic acids, alkenylsuccinic acid anhydrides, dialkyl acid phosphates, sorbitan mono-oleate, butyl stearate, butyl naphthenate and aluminum stearate.

Amino-organosilicon compounds that are useful as corrosion inhibitors in the compositions of this invention include both the amino-organo(hydrocarbonoxy) silanes and the amino-organosiloxanes wherein the organo group is a divalent hydrocarbon group containing at least three carbon atoms and wherein the amino group is connected to silicon through at least three successive carbon atoms of the organo group. Suitable amino-organo(hydrocarbonoxy)silane corrosion inhibitors include beta(aminophenyl)ethyltriethoxysilane; gamma-aminopropyltriethoxysilane, N-(beta-aminoethyl)gamma-aminopropyltriethoxysilane and p-aminomethylphenyltriphenoxysilane. Suitable amino-organosiloxane corrosion inhibitors include homopolymers composed of beta-(aminophenyl)ethylsiloxy, gamma-aminopropylsiloxy, N-(beta-aminoethyl) gamma-aminopropylsiloxy or p-aminomethylphenylsiloxy groups as well as copolymers composed of one or more of the aforementioned aminoorganosiloxy groups and one or more hydrocarbonsiloxy groups (e.g. methylsiloxy, di methylsiloxy, trimethylsiloxy and triphenylsiloxy groups).

The alkali metal salts of carboxyorganosiloxanes that are useful as corrosion inhibitors in the compositions of this invention include alkali metal salts of carboxyalkylsiloxanes wherein the carboxy group is linked to silicon through at least two successive carbon atoms of the alkyl group. Such siloxanes include homopolymers composed of $KOOCCH_2CH_2SiO_{1.5}$, $KOOCCH_2CH_2SiO_{1.5}$, $NaOOCCH_2CH_2SiO_{1.5}$, $NaOOCCH_2CH_2Si(CH_3)O$, and $LiOOC(CH_2)_4Si(C_6H_5)_2O_{0.5}$ groups as well as copolymers composed of one or more of these groups and one or more hydrocarbonsiloxy groups and/or one or more alkali metal-oxy substituted tetra-functional siloxy groups (e.g. $NaOSiO_{1.5}$, $(NaO)_2SiO$, $(NaO)_3SiO_{0.5}$, $KOSiO_{1.5}$ and $LiOSiO_{1.5}$).

The alkenyl succinic acids and anhydrides that are useful as corrosion inhibitors in the compositions of this invention are the reaction products of alpha-olefins (e.g. 1-n-octene and 1-n-pentene) and maleic acid or its anhydride. In these corrosion inhibitors the alkenyl group preferably contains from 8 to 12 carbon atoms. Illustrative of these corrosion inhibitors are octenyl succinic acid and its anhydride and pentenyl succinic acid and its anhydride.

The dialkyl acid phosphates that are useful as corrosion inhibitors in the compositions of this invention preferably contain from 8 to 12 carbon atoms in each alkyl group. Illustrative of such acid phosphates are dioctyl acid phosphate, didecyl acid phosphate and dilauryl acid phosphate.

The manner in which the compositions of this invention are produced is in no way critical. That is, the components of the compositions can be mixed in any convenient sequence and in any suitable apparatus. The techniques applicable to producing conventional aqueous lubricant compositions can be employed in producing the compositions of this invention.

The compositions of this invention are particularly suitable as lubricants for metal, especially as lubricants for ferrous metals, in metal cutting, forming and machining operations. In addition, these compositions are useful as hydraulic fluids, and as mold release agents for rubber and plastics. In the latter application, the compositions are applied to the molds in the usual manner for treating molds with conventional mold release agents.

The siloxane-polyoxyalkylene copolymers that are employed in the compositions of this invention, particularly those copolymers containing organofunctional groups (e.g. nitro, amino, halogen, amido and cyano groups), are useful per se as protective coatings on metals (e.g. ferrous metals) to which they can be applied by conventional coating methods. Moreover, such copolymers are useful per se as sizes for fibrous glass which can be employed in accordance with known sizing methods to size fibrous glass prior to forming composite articles. Such composite articles can comprise the sized glass and thermosetting resins such as melamine and phenolformaldehyde resins and such composite articles are useful in the areas in which glass-thermosetting resin composite articles are conventionally employed (casings and dielectric inserts for electric motors). Such copolymers are also useful as anti-foam agents for hydrocarbons, as leveling agents in conventional vinyl halide paints and as antistatic agents for organic textiles.

The following tests were conducted on compositions of this invention to evaluate them as lubricants.

A. Falex Load Test

In this test the lubricant is evaluated in a Falex Lubricant Test Machine. The machine consists of a steel shaft and two steel V-blocks that are positioned so that they can be forced against the shaft. The shaft and the V-blocks are immersed in the lubricant to be tested. The shaft is rotated and a load is applied to the V-blocks, forcing them against the shaft. The load is increased until failure occurs (i.e. seizure between the rotating shaft and the V-blocks or a radical increase in wear with no increase in load). The load at which failure occurs is the "Falex Load" value for the lubricant. The Falex Load values for various known fluids are as follows:

| Fluid: | Falex load (pounds) |
|---|---|
| $C_4H_9(OC_3H_6)_6OH$ | 400 |
| $C_4H_9(OC_3H_6)_{17.7}OH$ | 1250 |
| Dimethylpolysiloxane oil | <100 |
| Gulf Security Oil "A" (a refined petroleum oil having a viscosity of about 44 SUS at 210° F.) | <500 |
| Kendall Automatic Transmission Oil ( a refined paraffinic hydrocarbon oil having a viscosity of about 52 SUS at 210° F.) | <500 |

B. Falex wear test

This test is conducted in a manner similar to the Falex Load Test except that the load on the V-blocks is kept constant (e.g. at 200 lbs. or 1000 lbs.) for a fixed period of time (e.g. 1 hr. or 3 hrs.). The loss in weight of the rotating shaft caused by contact with the V-blocks is the "Falex Wear" value for the lubricant. The loss of weight is measured in milligrams.

The following examples illustrate the present invention:

Example I

Several aqueous lubricant compositions of this invention were produced by simply mixing the indicated copolymers with water or, in one case, with aqueous ethylene glycol. The compositions gave the following results on the Falex load test:

TABLE I

| Copolymer | Amount of copolymer [1] | Failure load (lbs.) |
|---|---|---|
| IV | 1.0 | [4] 4,500 |
| II | 1.0 | 3,200 |
| II | 5.0 | 1,500 |
| II and IV[2] | 0.2 | 2,750 |
| II and IV[2] | 0.7 | 3,750 |
| II and IV[2] | 1.0 | 4,000 |
| II and IV[2] | 2.0 | [4] 4,500 |
| III | 0.2 | 3,750 |
| III | 0.7 | [4] 4,500 |
| III | 1.0 | [4] 4,500 |
| III | 2.0 | [4] 4,500 |
| III | [3] 2.0 | [4] 4,500 |

[1] Parts by weight per 100 parts by weight of water.
[2] Equal weight mixture.
[3] Equal amounts of water and ethylene glycol used in this run.
[4] No failure up to this load at which time the test was stopped.

Example II

The Falex Wear Test results with several aqueous lubricant compositions of this invention are shown in Table II.

For comparison purposes, the results of Falex Wear Tests using copolymer-free ("Blank") aqueous lubricant compositions are also shown on Table II. These blank compositions are illustrative of conventional aqueous lubricant compositions.

All of the compositions tested contained 1.0 parts of morpholine and 1.0 part of potassium nitrite as corrosion inhibitors and 1.0 part of the dibutyl amine salt of lauric acid as an additional lubricity-imparting additive. All parts are parts by weight.

TABLE II

| Composition | Parts water | Parts ethylene glycol anti-freeze | Parts polyoxy-alkylene base fluid [1] | Copolymer Type | Copolymer Parts | Wear test Time (hrs.) | Wear test Load (lbs.) | Wear test Wear (mgs.) |
|---|---|---|---|---|---|---|---|---|
| 1 | 45.5 | 32.9 | 18.4 | III | 1.0 | 3 | 200 | 14 |
| 2 | 45.5 | 32.9 | 18.4 | V | 1.0 | 1 | 1,000 | 6 |
| 3 | 45.5 | 32.9 | 18.4 | III | 1.0 | 1 | 1,000 | 13 |
| 4 | 36.9 | 40.7 | 18.4 | III | 1.0 | 1 | 1,000 | 35 |
| Blank | 45.5 | 32.9 | 18.4 | None | None | 3 | 200 | 22 |
| Blank | 45.5 | 32.9 | 18.4 | None | None | 1 | 1,000 | 175 |
| 5 | 55.3 | 40.7 | 0.0 | V | 1.0 | 1 | 1,000 | 15 |
| 6 | 55.3 | 40.7 | 0.0 | III | 1.0 | 1 | 1,000 | 16 |
| 7 | 55.3 | 40.7 | 0.0 | III | 1.0 | 1 | 2,000 | 24 |
| Blank | 56.0 | 41.0 | 0.0 | None | None | 1 | 1,000 | 32 |

[1] Having the average formula: $HO(CH_2CH_2O)_y(C_3H_6O)_xH$ having a viscosity of 90,000 Saybolt Universal seconds at 100° F. and having a weight ratio of $-CH_2CH_2O-$ to $-C_3H_6O-$ groups of 3:1.

*Example III*

Several aqueous lubricant compositions of this invention were tested in the Falex Load Test at two temperatures. The compositions tested and the test temperatures are shown in Table III. The parts are parts by weight.

TABLE III

| Composition | Copolymer Type | Copolymer Parts | Parts water | Organic base fluid [1] | Temp., °F. |
|---|---|---|---|---|---|
| 1 | II | 1 | 8 | 3 | 77 / 146 |
| 2 | II | 1 | 36 | 3 | 78 / 122 |
| 3 | XVI | 1 | 99 | 0.0 | 109 / 160 |
| 4 | XVI | 5 | 95 | 0.0 | 97 / 149 |
| 5 | II | 1 | 99 | 0.0 | 73 / 118 |

[1] A mixture of 2 parts di-2-ethylhexyl sebacate and 1 part of a commercially available hydrocarbon lubricating oil that has a viscosity of 44 Saybolt Universal Seconds at 210° F. that has an SAE viscosity of 10W and that is sold under the name "Security Oil 44" by the Gulf Oil Co.

Failure (i.e. seizure or rapid loss of the rubbing surfaces by wear) did not occur in any of the tests which were terminated at a load of 400 pounds in each of the lower temperature tests and at a load of 800 pounds in each of the higher temperature tests. When pure water was tested, excessive wear occurred at a 200 pound load when the test temperature was 86° F. at a 250 pound load when the test temperature was 250° F.

*Example IV*

Copolymer V can be produced by reacting one mole of allyl diethyl amine with one mole of a polymer having the formula

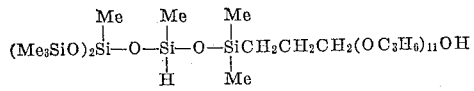

The reaction is conveniently conducted at a temperature of 100° C. employing 100 parts per million based on the weight of reactants of platinum in the form of chloroplatinic acid as a catalyst and employing xylene as a solvent.

*Example V*

Copolymer VI can be produced by reacting one mole of N-allyl ethylene diamine with one mole of a polymer having the formula

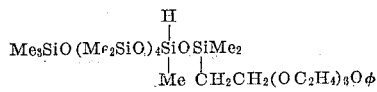

The reaction is conveniently conducted at a temperature of 110° C. employing 100 parts per million based on the weight of the reactants of platinum in the form of chloroplatinic acid as a catalyst and employing toluene as a solvent under reflux conditions.

*Example VI*

Copolymer VIII can be produced by reacting one mole of allyl cyanide with one mole of a polymer having the formula

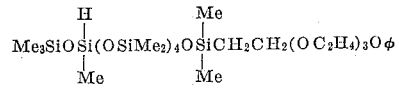

The reaction is conveniently conducted at a temperature of 125° C. employing two hundred parts per million (based on the weight of the reactants) of platinum in the form of chloroplatinic acid as a catalyst and employing xylene as a solvent.

*Example VII*

Copolymer IX is readily prepared by equilibrating the appropriate methylsiloxanes, nitrophenyl(ethyl)siloxanes and methylhydrogensiloxanes in the presence of an acid catalyst to produce a polymer having silanic hydrogen and then reacting the latter polymer with the appropriate vinyl end-blocked oxyalkylene polymer according to the addition process described hereinabove to produce Copolymer IX. Similarly, Copolymers V, VII, VIII, X and XI, as well as other copolymers having organofunctional substituents, can be produced by analogous two-step processes involving first the equilibration of the appropriate hydrocarbonsiloxanes, organo-functional siloxanes and hydrogensiloxanes to produce an Si—H containing siloxane which can then be reacted by an addition reaction with an alkenyl ether of an oxyalkylene polymer to produce the copolymer.

Copolymers containing organofunctional groups can also be prepared by equilibrating the appropriate hydrocarbon siloxanes, chlorohydrocarbonsiloxanes and organofunctional siloxanes to produce a polymer that can be reacted through the halohydrocarbon groups therein with alkali metal salts of oxyalkylene polymers in accordance with the metathesis procedure described hereinabove.

*Examples VIII*

Copolymer X can be produced by reacting one mole or vinyl acetate with one mole of a polymer having the formula

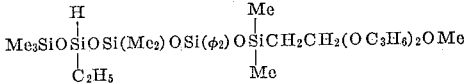

The reaction is conveniently conducted at a temperature of 100° C. employing 50 parts per million (based on the weight of reactants) of platinum in the form of chloroplatinic acid as a catalyst and employing toluene as a solvent.

Example IX

Copolymer XI can be produced by reacting one mole of the amide of acrylic acid with one mole of a polymer having the formula

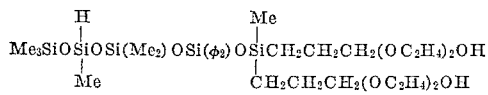

The reaction is conveniently conducted at a temperature of 200° C. employing 250 parts per million (based on the weight of reactants) of platinum in the form of chloroplatinic acid as a catalyst.

Concentrated admixtures containing an above-described base fluid and relatively large amounts of the above-described siloxane-polyoxyalkylene copolymers are conveniently and economically stored and shipped. Such admixtures can then be readily diluted just prior to use to produce the aqueous lubricant compositions of this invention described above. Such admixtures can contain from over 10 parts up to 50 or even as high as 70 parts by weight of the copolymer per 100 parts by weight of the base fluid. Such admixtures can also contain the various additional additives described above in amounts from over 5 parts to up to 25 or even as high as 35 parts by weight per 100 parts by weight of the base fluid. Dilution of such admixtures to form aqueous lubricant compositions of this invention is readily accomplished by mixing the admixtures wtih water or with mixtures of water and an organic lubricant base fluid.

It should be understood that the various above-mentioned additional additives which may be present in the aqueous lubricant composition of this invention are not an exhaustive list of such materials. By way of illustration, a base (e.g. sodium hydroxide) can be added to the composition of this invention when necessary or desirable in order to maintain the pH of the composition above 7. As a further illustration, anti-microbacterial agents such as Metasol L can be added to the compositions of this invention. Metasol L is an aqueous solution containing di(phenyl mercuric) ammonium propionate in an amount that provides 6 wt.-percent of mercury. As a further illustration, silicon anti-foam agents can be added to the composition. Illustrative of the suitable types of silicone anti-foam agents are trimethylsiloxy end-blocked dimethylpolysiloxane oils having a viscosity from 350 to 500 centistokes at 25° C. Such oils can be mixed with finely divided silica, e.g. about 3 wt.-percent silica.

What is claimed is:

1. A siloxane consisting essentially of from 1 to 99 mole-percent of units represented by the formula

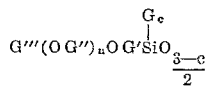

wherein G''' is a monovalent hydrocarbon group, G'' is an alkylene radical containing at least two carbon atoms, G' is a divalent hydrocarbon group, G is a member selected from the group consisting of the unsubstituted monovalent hydrocarbon groups and a monovalent hydrocarbon group containing a substituent selected from the group consisting of the halogen atoms and the cyano, amino, amido, carbalkoxy, acyloxy, mercapto and nitro groups, $n$ has a value of at least 2 and $c$ has a value from 0 to 2 inclusive and from 1 to 99 mole-percent of organofunctional units selected from the group represented by the formulae:

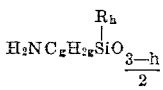

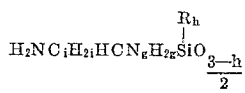

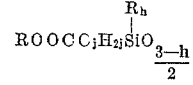

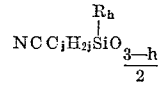

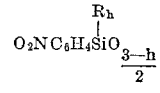

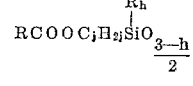

and

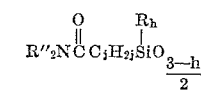

wherein R is an unsubstituted monovalent hydrocarbon group, R'' is a member selected from the group consisting of the unsubstituted monovalent hydrocarbon groups and the hydrogen atom, $g$ has a value from 3 to 5 inclusive, $h$ has a value from 0 to 2 inclusive, $i$ has a value from 2 to 3 inclusive and $j$ has a value from 2 to 4 inclusive.

2. A siloxane consisting of from 1 to 98 mole-percent of the units represented by the formula

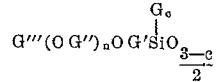

wherein G''' is a monovalent hydrocarbon group, G'' is an alkylene radical containing at least two carbon atoms, G' is a divalent hydrocarbon group, G is a member selected from the group consisting of the unsubstituted monovalent hydrocarbon groups and a monovalent hydrocarbon group containing a substituent selected from the group consisting of the halogen atoms and the cyano, amino, amido, carbalkoxy, acyloxy, mercapto and nitro groups, $n$ has a value of at least 2 and $c$ has a value from 0 to 2 inclusive, from 1 to 99.8 mole-percent of the organofunctional units defined in claim 1 and from 1 to 99.8 mole-percent of the units represented by the formula

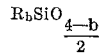

wherein R is an unsubstituted monovalent hydrocarbon group and $b$ has a value from 1 to 3 inclusive.

References Cited by the Examiner

UNITED STATES PATENTS

| | | | |
|---|---|---|---|
| 2,846,458 | 8/1958 | Haluska | 252—49.6 X |
| 2,868,824 | 1/1959 | Haluska. | |
| 2,941,944 | 6/1960 | Ervine et al. | 252—49.5 X |
| 3,089,854 | 5/1963 | Meyers et al. | 252—49.5 |

FOREIGN PATENTS

| | | |
|---|---|---|
| 681,248 | 10/1952 | Great Britain. |
| 718,179 | 11/1954 | Great Britain. |
| 758,780 | 11/1957 | Great Britain. |

OTHER REFERENCES

Baker et al.: Polar-Type Rust Inhibitors, Industrial and Engineering Chemistry, December 1948, p. 2346.

DANIEL E. WYMAN, *Primary Examiner.*